Nov. 4, 1952     H. V. KINGSMORE     2,616,328

FASTENER

Filed Feb. 1, 1951     2 SHEETS—SHEET 1

INVENTOR.

Harry Vincent Kingsmore

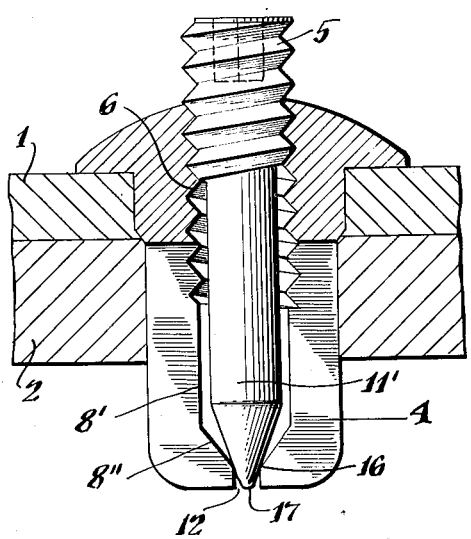
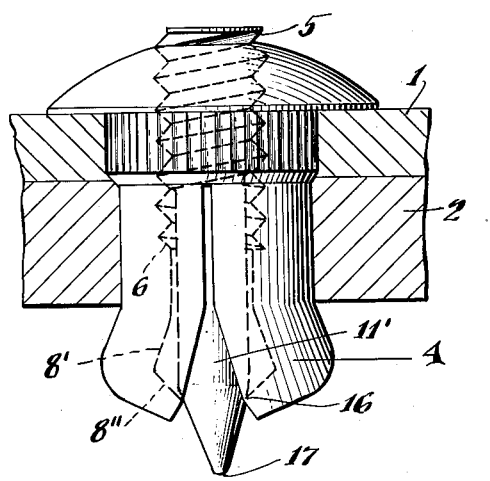
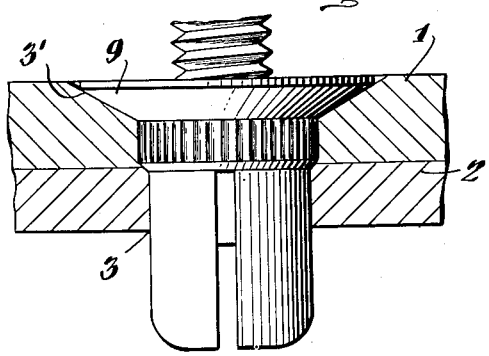
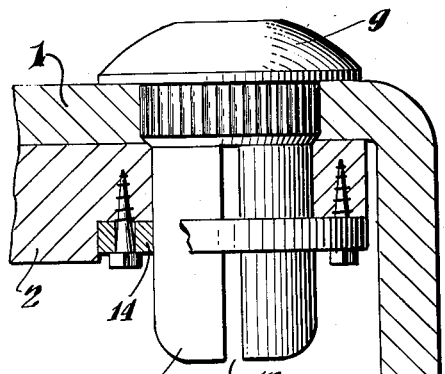
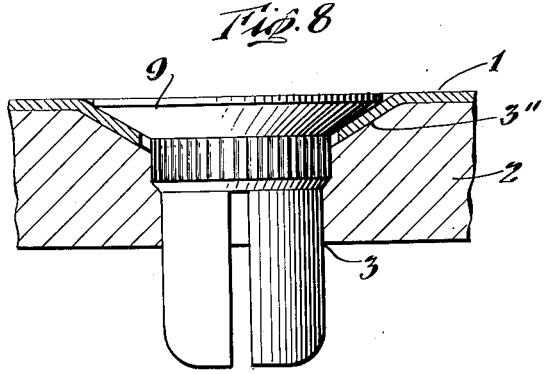
INVENTOR.
Harry Vincent Kingsmore Patented Nov. 4, 1952

2,616,328

UNITED STATES PATENT OFFICE 2,616,328

FASTENER

Harry Vincent Kingsmore, West Babylon, N. Y., assignor of one-fourth to William F. Mathias, Jr., Brightwaters, N. Y.

Application February 1, 1951, Serial No. 208,903

1 Claim. (Cl. 85—40)

The invention relates in general to fasteners, and deals in particular with a rivet-like fastener for rigidly securing together juxtaposed sheets, plates, panels or other parts requiring rigid assembly, and this application and specification is a continuance in part of the application heretofore filed by me on October 11, 1950, and which was assigned Serial Number 189,551, now abandoned.

Fasteners for securing together parts, such as panels, plates and so forth, usually consist of more or less complicated operations and a variety of tools or instruments; in general, the use of such fasteners requiring a number of individual operations. Likewise, with the exception of toggle bolts and explosive rivets, such fasteners as heretofore known require access to both sides of the parts to be secured together. Furthermore, presently known rivets, once secured, cannot be removed without either drilling or burning, and in many cases leaves the sheets, plates or panels with undesirable projections or protrusions.

It is one object of this invention to provide a simple rivet-like fastener for securing together juxtaposed sheets, panels and other parts in such manner as to produce a rigid and rugged joiner thereof, capable of withstanding great stresses, extended and continuous vibration. It is another object of this invention to provide such rivet-like fastener which shall be of light weight and shall be of one unitary piece. It is another object of this invention, that it have only one operative part. It is a further object of this invention to provide a rivet-like fastener of the type described, which shall be capable of being easily installed and easily removed, and which can be re-used again without harm to sheets, panels or parts, as no drilling or burning is necessary for removing this rivet-like fastener. It is another object of this invention to provide a rivet-like fastener for securing together juxtaposed sheets, plates or other parts which shall be capable of being manipulated wherever access is available on one side only.

Other features and advantages of this invention are that these rivet-like fasteners may be made of nonmagnetic stainless steel, and therefore, in such case they are static-free, non-corroding, and may be used without painting, plating or other means to preserve them from the weather. They may be Rockwell tested to determine the consistency of expanding and contracting for easy removal. Another feature of this invention is that these rivet-like fasteners will accommodate a wide tolerance in nominal size. Another feature of this invention is that it does not require on rear panels, plates or parts, cams of any kind, springs, cones or any gadgets, or the need of a second man for a bucking tool such as is now required with heretofore known rivets and fasteners. The elimination of time-consuming operations is also an object of this invention, as it does not require heating and pneumatic guns. Also, heretofore known rivets and fasteners require three or four men for installation, whereas only one man is necessary for installing the rivet-like fastener of this invention.

Other objects, features and advantages of this invention will appear from the description thereof hereinafter set forth.

Fig. 4 is a view of the second form of my fastener before expansion of the outer member, the outer member and plates being shown in vertical section and the inner member being shown in elevation.

Fig. 5 is a view similar to Fig. 4 after expansion of the outer member into locked position, the outer member also being shown in elevation.

Fig. 6 is a view similar to Fig. 4 of a somewhat modified second form of fastener.

Fig. 7 is a view showing the application of the fastener of Fig. 4 to a different assembly of plates, the outer member of the fastener being shown in elevation and the plates being generally shown in vertical section.

Fig. 8 is a view showing the application of the modified fastener of Fig. 6 to a different assembly of plates, the outer member of the fastener being shown in elevation and the plates being shown in vertical section.

Figure 1:
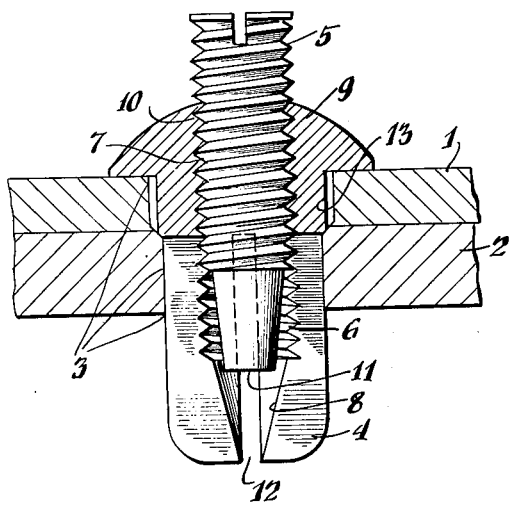
Fig. 1 is a view of the first form of my fastener before expansion of the outer member, the outer member and plates being shown in vertical section and the inner member being shown in elevation.
Figure 2:
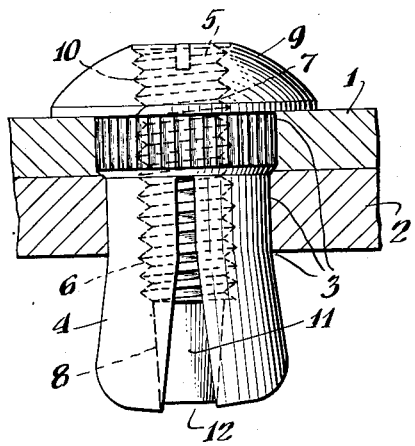
Fig. 2 is a view similar to Fig. 1 after expansion of the outer member into locked position, the outer member also being shown in elevation.

Referring to Figures 1 and 2 of the drawings illustrated, the juxtaposed parts to be secured together in the form of plates 1 and 2, are provided with a cylindrical passage or seating 3, to receive the rivet-like fastener of the invention. The rivet-like fastener itself consists of a single assembly of two parts, namely a cylindrical body portion 4, and an inserted bolt, slotted screw or other type of recessed head member 5. The body portion 4 is provided with longitudinal tubular passage 6, specifically designed to receive and cooperate with the inserted bolt, slotted screw or other type of recessed head member 5 to produce the firm fastening and securing effect desired.

Figure 3:
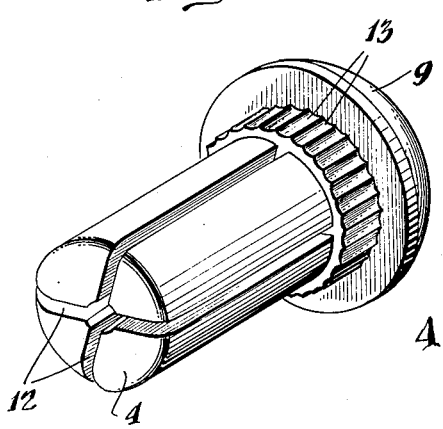
Fig. 3 is an isometric view of the outer member of Figs. 1 and 2.

The tubular passage 6 is formed between a threaded cylindrical wall 7 at the upper end, and a conically restricted wall 8 at the lower end. The body portion 4 is flanged outwardly at the upper end to form a head 9. The threaded portion 7 of the wall of the tubular passage 6 extends downwardly for a substantial part thereof. The remaining tubular passage 6, is tapered inwardly 8 to the bottom of the body portion 4. The inserted bolt, slotted screw or other type of recessed head member 5 is provided with an externally threaded wall portion 10 and a lower conical portion 11. The threads of the wall portion 10 correspond with the threads of the wall portion 7. It is one feature of the invention that the taper of the portion 11 of the inserted bolt, slotted screw or other type of recessed head member 5 and the taper of the portion 8 of the tubular passage 6 correspond in such manner and in such fashion that the inward taper of the wall 8 is slightly greater than the taper of the wall 11. In the fastening operation the inserted slotted screw or other type of recessed head member 5 is screwed into the passage 6 until the walls 11 and 8 meet, making a tangential surface contact, with the conical and portion of the inserted slotted screw or other type of recessed head member 5 exerting an approximately lateral pressure against the wall 8 of the cylindrical body portion 4, whereby the walls of the latter are expanded outwardly and laterally against the wall of the seating 3 of plates 1 and 2, thereby securing such plates together by a riveting effect. In order to permit the walls of the body portion 4 to thus expand freely and without injury thereto, the inherent resistance of the body portion is broken by a longitudinal slot 12, as shown in Figure 1, extending through the major part of the body portion. It is desirable to provide a plurality of such longitudinal slots, usually equidistanced from each other, and in a preferred embodiment of the rivet-like fastener of the invention. Four such slots are provided, positioned at approximately equal distances from each other, as shown in Figure 3. Such slot or slots 12 are advantageously formed in such manner as to terminate at the lower end of the knurling or spline 13. The body portion 4 of the rivet-like fastener of the invention is constructed of non-magnetic stainless steel so that on release of the outward pressure described, by means of removal of the inserted slotted screw or other type of recessed head member 5, the walls of the cylinder revert toward their original position, thereby facilitating easy removal of the rivet-like fastener from the passage or seating 3.

Figure 3A:
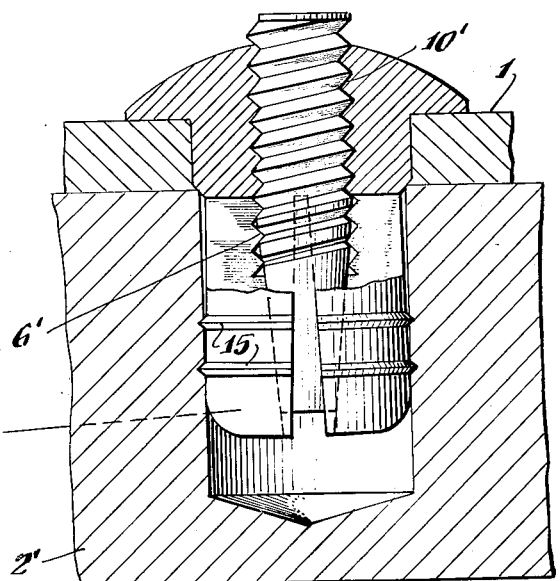
Fig. 3a is a view of a somewhat modified first form of my fastener, the plates and a portion of the outer member being shown in vertical section.

It will be understood that the degree of the cooperating tapers of the walls of the inserted slotted screw or other type of recessed head member 5 and the body portion 8 may be arranged in any desired manner, that so long as the outward pressure on the wall 8 is exerted in such manner that it is transferred at least in part against the plate or other part to be secured which is furtherest removed from the upper portion of the rivet-like fastener, i. e., in Figure 2 against the plate 2. The pitch of the threads 7 and 10 is not of critical importance, although it is preferred to arrange the pitch in such manner that the fastening operation is completed with a minimum of turns consistent with the required securing power of the rivet-like fastener. The outwardly flanged head 9 rests firmly against the surface of plate 1. Where, as in Figure 3a of the drawings, plate 1 is to be secured against a solid wall, block or deep plate 2', either horizontally or vertically, the lower portion of the cylindrical body portion is provided with a plurality of raised ridges, 15, which cut into the solid wall or plate 2' when the slotted cylindrical body portion 4 is expanded outwardly against the walls of the solid wall, block or plate 2', thereby producing the desired securing effect. Where it is desired to increase the ease of outward expansion of the slotted cylindrical body portion 4, the taper 8, as originally shown in Figures 1 and 2 of the drawings, in the wall of said body portion, may be cut out as in 8' of Figures 4 and 5 of the drawings, leaving a small inward taper 8" terminating at the opening 12, so as to produce a shoulder 16, and the inserted slotted screw or other type of recessed head member being modified accordingly by eliminating the taper in 11 as originally shown in Figures 1 and 2 of the drawings, for most of its length below the thread as in 11' of Figures 4 and 5 of the drawings, leaving a small conical taper 17 at the end thereof, where upon further downward movement of the inserted screw, it may easily pass into the opening 12. The elimination of the full taper in the wall of the body portion to produce the wall 8' in Figures 4 and 5 and the elimination of the conical taper 11 in the insert in Figures 1 and 2 of the drawings, as in 11' of Figures 4 and 5 of the drawings, is calculated to produce greater facility and ease of action and cooperation between the insert and the body portion to be outwardly expanded. The upper wall of said conical taper 17, as depicted in Figures 4 and 5 of the drawings, will on downward movement of the inserted screw or member, engage the shoulder 16 on point contact at 16, thereby eliminating the drag or resistance which may be consequent on a full wall contact as depicted in Figures 1 and 2 of the drawings. If desired, plate 1 may be provided with a countersink or counterbore to receive and conceal a flat head 9 as in Figure 6 of the drawings depicting countersunk seating 3' in plate 1, or if plate 1 is thin plate 2 may contain the countersunk seating 3" as depicted by Figure 8 of the drawings, in which case the configuration of the lower part of the head should correspond to the configuration of the countersink.

It will be noted that the rivet-like fastener of the invention requires a minimum of parts and of standard sizes. In commercial practice it will be supplied as a complete single assembly of body portion and inserted screw.

The rivet-like fastener is inserted in cylindrical opening plate 1, tapped with plastic hammer forcing knurling or spline 13 into opening plate 1. This operation is only required once. This operation can include outside and inside panels, if plate 1 is thin. The rivet-like fastener requires a minimum of weight and in fact weighs less than any comparable fastener presently available. Heating rivets, passing rivets and bucking them, and other time-consuming operations are eliminated and a single operation provides the required riveting and fastening effect. The rivet-like fastener of the invention is installed easily and does not require access from more than one side. This rivet-like fastener can be installed rigidly and securely from the exterior. It is also understood in cases where panels, plates or sheets are to be removed no drilling or burning is necessary. It is instantly adjustable to various tolerances of plates, panels or other parts within the body limits of one certain new rivet-like fastener. The rivet-like fastener is, likewise, easily removed from its seating as there are no deformations or the like which would tend to interfere with any quick removal. Removal of the rivet-like fastener does not affect its availability for, and effectiveness in, subsequent use, for which reason the rivet-like fastener is highly useful wherever removal and re-installation are required, such as train wrecks, bus collisions, construction extensions, etc., or wherever removal of rivets or fasteners may be necessary for replacement of new parts.

The rivet-like fastener rigidly joins the parts to be secured together and produces a rugged assembly capable of withstanding great stresses and shocks, and capable of withstanding, without deformation or loosening, extended and continued vibration under a variety of operating conditions. In fact, the more stress the tighter the rivet-like fastener becomes, due to its wedge-like body portion. The rivet-like fastener is useful wherever parts have to be secured rigidly, and is particularly adapted for use for panels or other board fastenings, in such various structures as bridges, furnaces, metal furniture, railroad cars, buses, automobiles, airplanes, refrigerators, ship building, radios, construction, tractors, farm equipment, lathes and all machine shop equipment, elevators, etc., and wherever rigid fastening is concerned. The rivet-like fastener of the invention is also capable of replacing the heretofore known rivets in a number of stationary and mobile structures or apparatus. These rivets, or rivet-like fasteners, can also be used where metal is required on wood, by the use of a countersunk washer inbedded in wood structure, as in Figure 7 of the drawings depicting countersunk metal washer 14 which is imbedded in wood 2.

Wherever a plurality of fasteners are employed to produce a required fastening or securing effect, the greatest rigidifying and securing effect of the rivet-like fasteners of the invention makes it possible to use a very minimum of these rivet-like fasteners in accordance with the invention, in order to obtain the given required fastening and securing effect.

What I claim is:

A fastening device for securing together two juxtaposed parts having aligned bores, said device comprising: an outer member having a smooth, circular head portion and a cylindrical portion extending from the head portion and adapted to fit snugly within the bores, the cylindrical portion adjacent the head portion being knurled to engage within at least one of the bores and hold the member against rotation, and the other end of the cylindrical portion being divided by kerfs into longitudinal segments, the outer member being provided with an axial bore converging inwardly at the end removed from the head portion, and the bore being provided with threads extending along the bore from the head portion; and a generally cylindrical inner member adapted to fit within the bore of the outer member, the inner member at one end thereof having a recessed head and having threads engaging the threads of the outer member, and the other end of the inner member being generally conical in form to provide a cam surface engaging the inner circumference of the converged end of the axial bore to radially spread the segments, the taper of the converged end of the axial bore being substantially greater than the taper of the conical end of the inner member whereby said conical end engages the converged end of the axial bore of the outer member in substantially a line contact the length of the cylindrical portion of the inner member, including the threaded portion thereof, being substantially equal to the total length of the outer member whereby as the segments are moved to spread position, the threaded end of the inner member moves to a position flush with the head portion of the outer member and the segments are held in spread condition by engagement of the cylindrical portion of the inner member therewith, the segments being resilient and tending to return to substantially their original, unspread position upon removal of the inner member.

HARRY VINCENT KINGSMORE.

REFERENCES CITED

The following references are of record in the file of this patent:

UNITED STATES PATENTS

| Number | Name | Date |
|---|---|---|
| 104,576 | Good | June 21, 1870 |
| 1,413,998 | Templeton | Apr. 25, 1922 |
| 2,051,066 | Anderson | Aug. 18, 1936 |
| 2,181,103 | Davis | Nov. 21, 1939 |
| 2,236,079 | Wipper | Mar. 25, 1941 |
| 2,241,609 | McClelland | May 13, 1941 |
| 2,379,786 | Bugg | July 3, 1945 |

FOREIGN PATENTS

| Number | Country | Date |
|---|---|---|
| 514,692 | Germany | Dec. 16, 1930 |
| 563,295 | Great Britain | Aug. 8, 1944 |
| 565003 | Great Britain | Oct. 23, 1944 |